(12) United States Patent
Hu (10) Patent No.: US 6,483,916 B1
(45) Date of Patent: Nov. 19, 2002

(54) TELEPHONE SET HAVING STORAGE CAVITY, FOR RECEIVING HANDSET

(76) Inventor: Tien-Tse Hu, No. 9, Alley 14, Lane 75, Nanking E. Rd., Sec. 4, Taipei (TW)

( * ) Notice: Subject to any disclaimer, the term of this patent is extended or adjusted under 35 U.S.C. 154(b) by 0 days.

(21) Appl. No.: 09/470,048

(22) Filed: Dec. 14, 1999

(51) Int. Cl.[7] .................................................. H40M 1/00
(52) U.S. Cl. .................................................. 379/428.02
(58) Field of Search ................................ 379/424, 425, 379/426, 435, 446, 428.02

(56) References Cited

U.S. PATENT DOCUMENTS 4,598,175 A * 7/1986 Read ........................ 379/370
4,965,824 A * 10/1990 Hollowed et al. ..... 379/144.04

* cited by examiner

Primary Examiner—Jack Chiang
Assistant Examiner—Quynh H Nguyen (57) ABSTRACT

A telephone set comprises a main body and a handset. A storage cavity is formed in the main body for receiving the handset which has a slender body to be inserted into an opening of the storage cavity. A resilient actuator is disposed in the storage cavity and mounted to a hook switch on an electronic circuit within the main body. When the handset is received in the storage cavity, the resilient actuator is pressed to push a button that opens the hook switch to disconnect the circuit of the telephone set. When the handset is removed from the storage cavity, the resilient actuator returns to its free position and releases the button that activates the switch to connect the circuit of the telephone.

1 Claim, 8 Drawing Sheets

TELEPHONE SET HAVING STORAGE CAVITY, FOR RECEIVING HANDSET

FIELD OF THE INVENTION

The present invention generally relates to a telephone set, and more specifically to a telephone set having a storage cavity where a handset can be inserted into.

BACKGROUND OF THE INVENTION

A telephone set generally has a main body and a handset. In a conventional wired telephone, the handset is connected to the main body by a cord. The main body is usually provided with a recessed area on which a hook switch is disposed. When the handset is not in use, it is seated on the recessed area of the main body and the hook switch is opened to disconnect the telephone circuit. To use the telephone, the handset is picked up from the main body and the hook switch is activated to connect the telephone circuit so that a dialing can be started.

A wireless telephone does not use a cord to connect the handset to the main body. In addition to the recessed area on the main body for seating the handset, an on-off button may be provided on the handset so as to send control signals to connect or disconnect the telephone circuit in a remote location.

A problem commonly encountered after using a telephone is that the handset is not seated properly back to the recessed area on the main body of the telephone. Only when a user tries to make a next phone call can he discover that the telephone circuit has been in a busy state for a long time because the handset had not been properly seated back to disconnect the telephone circuit. This often causes inconvenience and make a people miss important calls. There is a strong need to provide a convenient and easy to use mechanism for a telephone set to store the handset and ensure the proper disconnection of the telephone circuit.

SUMMARY OF THE INVENTION

This invention has been made to overcome the above-mentioned drawback of a conventional telephone set. The primary object of the present invention is to provide a telephone set that has a storage cavity for receiving a handset and a hook switch mechanism that disconnects the telephone circuit when the handset is received in the storage cavity.

Accordingly, the telephone set comprises a main body and a handset. The main body is formed with a storage cavity and a resilient actuator disposed in the storage cavity and mounted to a hook switch through a fulcrum. The handset has a slender body that can be received in the storage cavity. When the handset is put into the storage cavity, the actuator pushes a button which opens the hook switch to disconnect the telephone circuit. When the handset is removed from the storage cavity, the resilient actuator returns to its free position and releases the button that actuates the hook switch to connect the telephone circuit.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
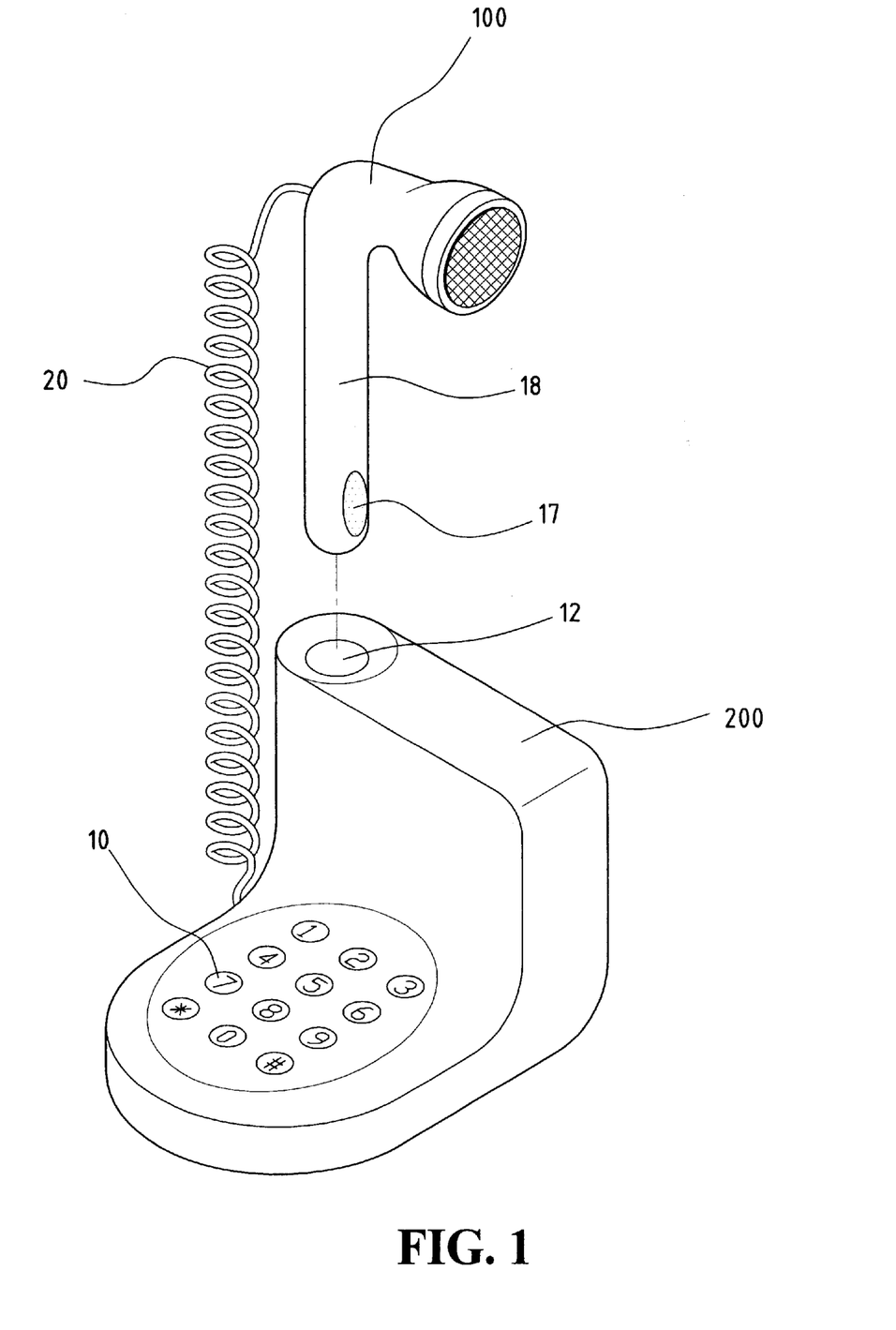
FIG. 1 is a perspective view of the telephone set according to the present invention.
Figure 2A:
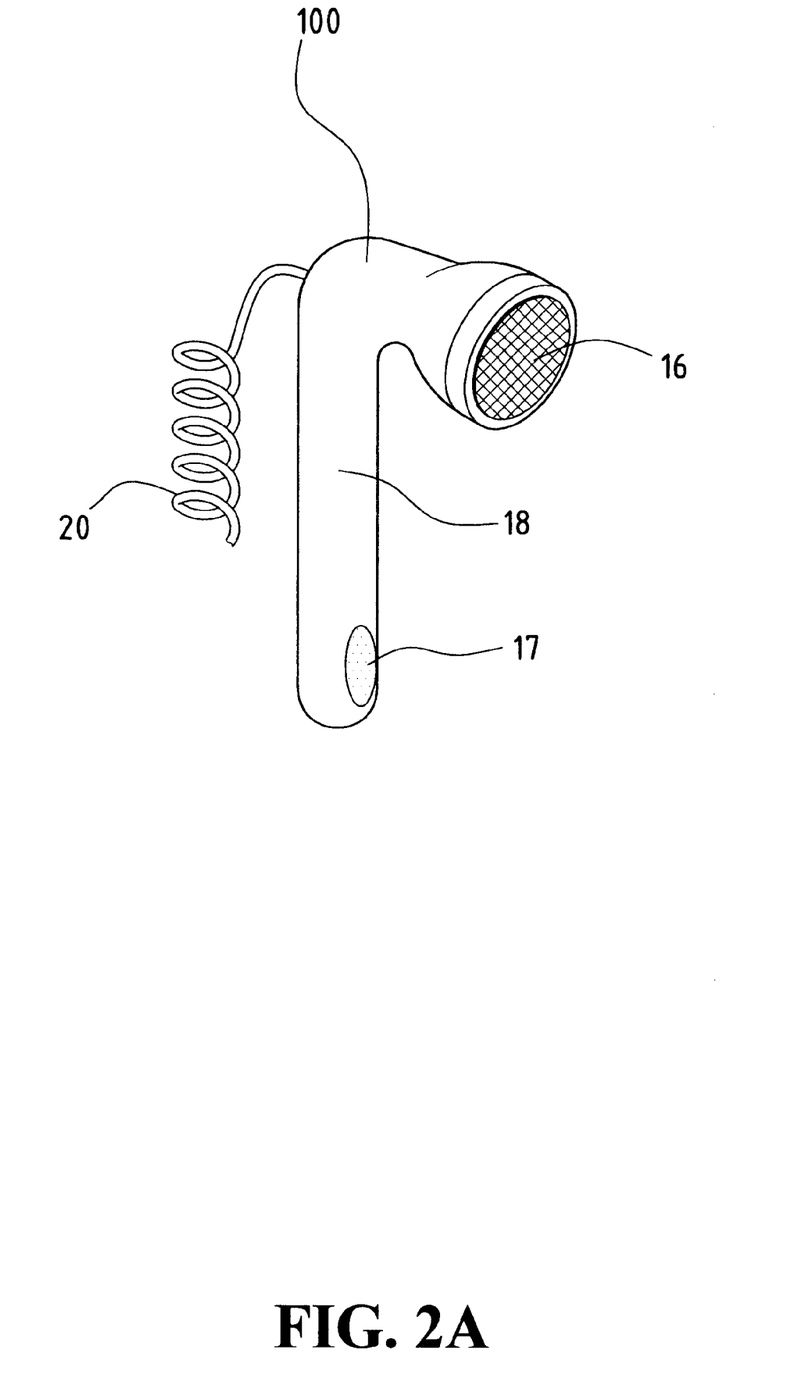
FIGS. 2A and 2B show two embodiments of the handset according to the present invention.
Figure 2B:
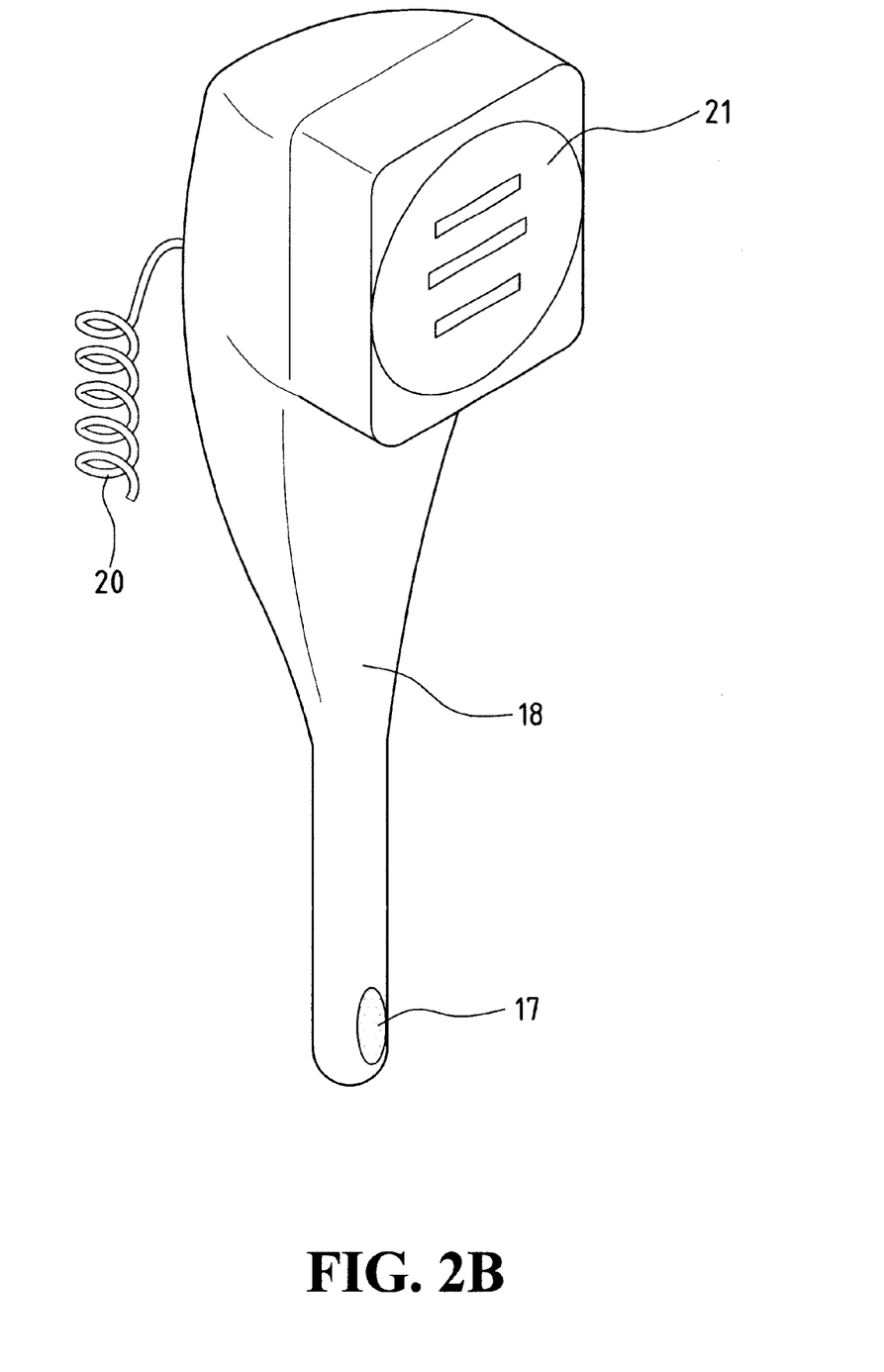

With reference to FIGS. 1–3, the electronic telephone set of this invention comprises a main telephone body 200 and a handset 100. The main telephone body 200 includes an enclosure, a dialer 10, a speech electronic circuit 11, and a storage cavity 12. At the upper end of the storage cavity 12 is an opening for receiving the handset 100. As shown in FIG. 1, the handset 100 generally includes a slender body 18 formed with a small condense microphone 17 at the bottom end and a speaker or an earphone at the upper end. A handset cord wire 20 connects the handset 100 to the main telephone body 200.

As shown in FIG. 2A, a first embodiment of the handset 100 of this invention has an earphone 16 formed at the upper end. A second embodiment of the handset 100 as shown in FIG. 2B has a speaker 21 formed at the upper end. The cord wire 20 is connected to the microphone 17 and the earphone 16 or the speaker 21. The handset 100 can be received in the storage cavity 12 by inserting the slender body 18 through the top opening of the storage cavity. The slender body 18 may have a round or polygon cross-section. The bottom end of the handset may have an arc or cone shape.

Figure 3A:
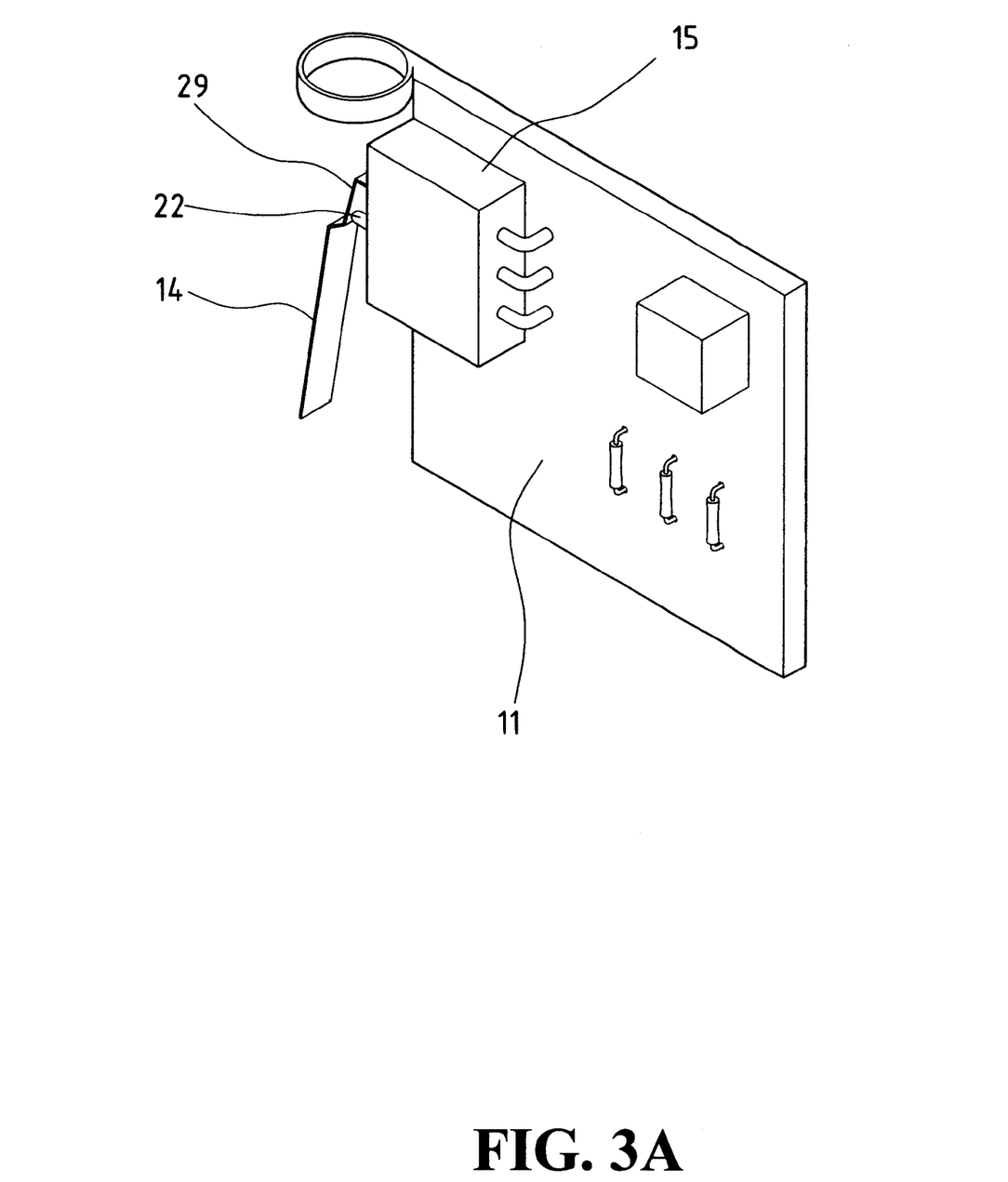
FIGS. 3A–3D illustrate different views of the handset, the actuator, the hook switch, the button and the storage cavity of the telephone set according to the present invention.
Figure 3B:
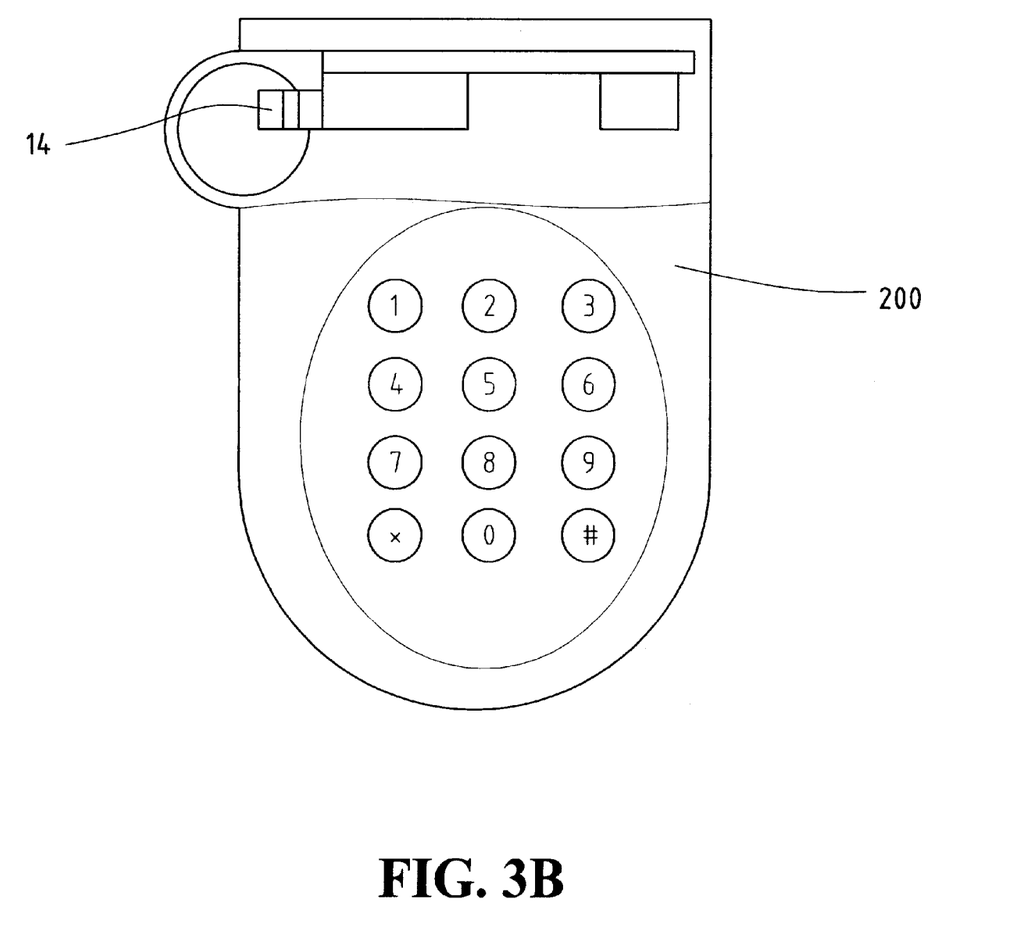

As shown in FIG. 3A, the speech electronic circuit 11 includes an actuator 14 and a hook switch 15. The actuator 14 is mounted on a fulcrum 29 as illustrated in FIG. 3A. The actuator 14 is a resilient member which generally forms an angle about 30° with a vertical line when it is in a free position without receiving any pressure. FIG. 3B shows a top view of the main body 200 and the actuator 14 in its natural position.

Figure 3C:
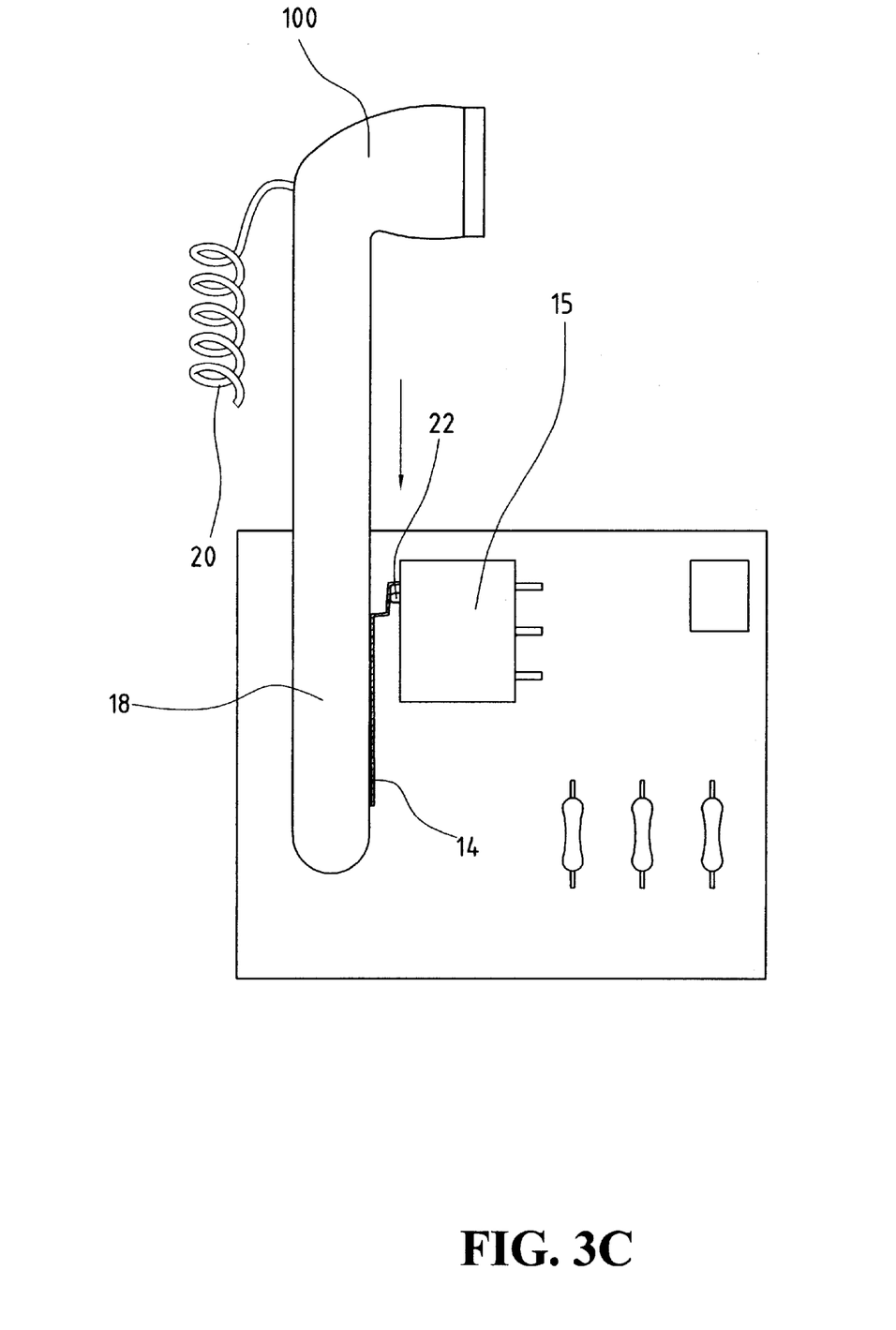
Figure 3D:
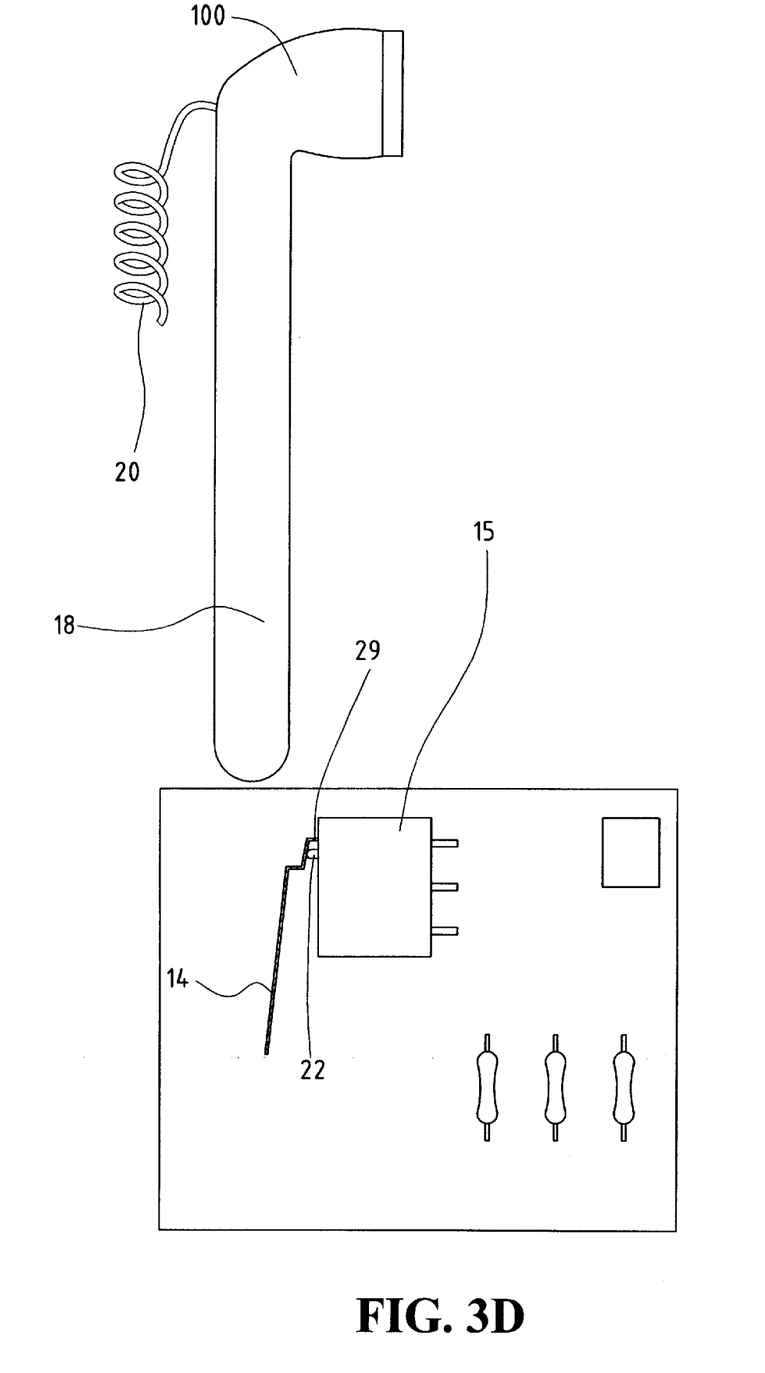

The hook switch 15 has a button 22 formed thereon as shown in FIG. 3C. When the handset 100 is received in the storage cavity 12 as shown in FIG. 3C, the slender body 18 presses the actuator 14 which then pushes the button 22 to open the hook switch 15 and break the telephone circuit. When the handset 100 is removed from the storage cavity 12 as shown in FIG. 3D, the actuator 14 is restored to the free position by its elastic force and the button 22 is no longer pushed. The release of the button 22 activates the hook switch 15 into a state that connects the telephone circuit. FIG. 3D further illustrates the actuator 14, the fulcrum 29, the button 22 and the hook switch 15. The storage cavity of this invention is generally tubular and can have either a round or a polygon circumference.

Figure 4:
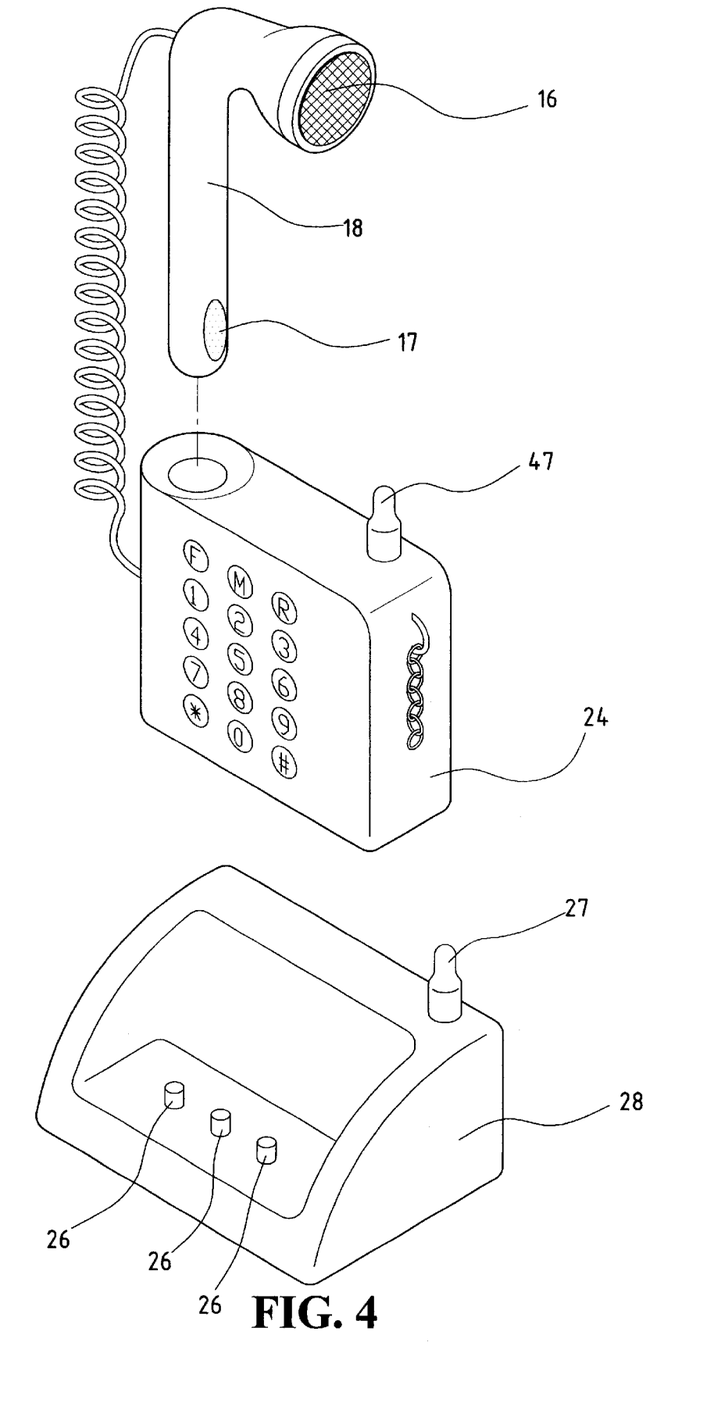
FIG. 4 is a perspective view of a wireless telephone according to the present invention.

As shown in FIG. 4, the present invention also applies to a wireless telephone. The wireless telephone according to the invention includes a base station 28 with a battery charger 26 and an antenna 27, and a mobile phone body 24 which also has an antenna 47. According to the present invention, a storage cavity is formed in the mobile body 24 and the handset can be received in the storage cavity through a top opening. The principle and operation of the wireless telephone of the invention are similar to what has been described above except that the handset is connected to the mobile phone body 24 by a cord.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A telephone set, comprising:

a main body having a storage cavity, said storage cavity having an opening;

a handset having an upper end with an earphone or a speaker, a lower end with a microphone, and a slender body, said slender body being receivable by said storage cavity through said opening;

a hook switch disposed within said main body;

a button disposed on said hook switch for controlling said hook switch, said hook switch disconnecting a telephone circuit when said button is pushed and connecting said telephone circuit when said button is released; and an actuator disposed in said storage cavity, said actuator being a resilient member and distant from said button when said actuator is in a free position without being pressed;

wherein said actuator is pressed by said handset to push said button for disconnecting said telephone circuit when said handset is received in said storage cavity, and said actuator returns to said free position and said button is released for connecting said telephone circuit when said handset is removed from said storage cavity.

* * * * *